(12) United States Patent
Hall et al.

(10) Patent No.: US 10,450,833 B2
(45) Date of Patent: Oct. 22, 2019

(54) SELF-REGULATING FLOW CONTROL DEVICE

(71) Applicant: ONESUBSEA IP UK LIMITED, London (GB)

(72) Inventors: Graham Hall, Aberdeen (GB); Robert Large, Lowestoft (GB)

(73) Assignee: OneSubsea IP UK Limited, London (GB)

(*) Notice: Subject to any disclaimer, the term of this patent is extended or adjusted under 35 U.S.C. 154(b) by 54 days.

(21) Appl. No.: 14/695,803

(22) Filed: Apr. 24, 2015

(65) Prior Publication Data

US 2015/0308222 A1    Oct. 29, 2015

Related U.S. Application Data

(60) Provisional application No. 61/983,940, filed on Apr. 24, 2014.

(51) Int. Cl.
*E21B 34/04* (2006.01)
*F16K 21/04* (2006.01)
(Continued)

(52) U.S. Cl.
CPC .......... *E21B 34/04* (2013.01); *E21B 33/035* (2013.01); *E21B 33/038* (2013.01);
(Continued)

(58) Field of Classification Search
CPC ...... E21B 34/04; E21B 33/038; E21B 33/076; E21B 33/035; F16K 21/04; G05D 7/014
(Continued)

(56) References Cited

U.S. PATENT DOCUMENTS

| 1,312,644 | A | * | 8/1919 | Raab et al. | ............. | F16K 17/00 |
| | | | | | | 137/464 |
| 2,635,620 | A | * | 4/1953 | Deardorff | ............. | F15B 21/044 |
| | | | | | | 137/197 |

(Continued)

FOREIGN PATENT DOCUMENTS

WO    2013/121212 A2    8/2013
WO    2013/160686 A2    10/2013
(Continued)

OTHER PUBLICATIONS

International Patent Application No. PCT/EP2015/058980 International Search Report and Written Opinion dated Dec. 16, 2015 (12 pages).

(Continued)

*Primary Examiner* — Reinaldo Sanchez-Medina
*Assistant Examiner* — Nicole Gardner

(57) ABSTRACT

A self-regulating flow control device for controlling the flow of injected fluid into a subsea well or flowline via a tree, manifold, or other access point on the subsea infrastructure by responding to the injection pressure being applied to prevent the conduit from collapsing. An embodiment of the self-regulating flow control device includes a housing having a first and second through bore, a piston moveable in the through bore, and a biasing member. When in an unactuated position, the biasing member biases the piston isolating the first through bore from the second through bore, and when in an actuated position, a pressure overcomes the biasing member to move the piston and expose the first through bore to the second through bore. The self-regulating control flow device prevents a vacuum from being drawn into the conduit system below during sudden decreases in uphole pressure by blocking or closing flow paths in the housing.

9 Claims, 13 Drawing Sheets

(51) Int. Cl.
  *G05D 7/01* (2006.01)
  *E21B 33/035* (2006.01)
  *E21B 33/038* (2006.01)
  *E21B 33/076* (2006.01)
  *F16K 17/196* (2006.01)
  *F16K 17/30* (2006.01)
(52) U.S. Cl.
  CPC .......... *E21B 33/076* (2013.01); *F16K 17/196* (2013.01); *F16K 17/30* (2013.01); *F16K 21/04* (2013.01); *G05D 7/014* (2013.01)
(58) Field of Classification Search
  USPC ........................ 137/505.13, 505.37, 494, 497
  See application file for complete search history.

(56) References Cited

U.S. PATENT DOCUMENTS

| | | | |
|---|---|---|---|
| 4,237,926 A * | 12/1980 | Walker | B60K 15/01 123/198 DB |
| 4,621,544 A * | 11/1986 | Re | F16H 59/30 137/494 |
| 4,892,364 A * | 1/1990 | Burgdorf | B60T 8/4059 303/113.4 |
| 6,009,950 A | 1/2000 | Cunningham et al. | |
| 6,145,594 A * | 11/2000 | Jones | E21B 33/037 166/361 |
| 6,637,514 B1 | 10/2003 | Donald et al. | |
| 6,823,941 B2 | 11/2004 | Donald | |
| 7,111,687 B2 | 9/2006 | Donald et al. | |
| 7,992,633 B2 | 8/2011 | Donald et al. | |
| 7,992,643 B2 | 8/2011 | Donald et al. | |
| 8,066,063 B2 | 11/2011 | Donald et al. | |
| 8,066,067 B2 | 11/2011 | Donald et al. | |
| 8,066,076 B2 | 11/2011 | Donald et al. | |
| 8,091,630 B2 | 1/2012 | Donald et al. | |
| 8,104,541 B2 | 1/2012 | Donald et al. | |
| 8,122,948 B2 | 2/2012 | Donald et al. | |
| 8,167,049 B2 | 5/2012 | Donald et al. | |
| 8,220,535 B2 | 7/2012 | Donald et al. | |
| 8,272,435 B2 | 9/2012 | Donald et al. | |
| 8,281,864 B2 | 10/2012 | Donald et al. | |
| 8,297,360 B2 | 10/2012 | Donald et al. | |
| 8,469,086 B2 | 6/2013 | Donald et al. | |
| 8,540,018 B2 | 9/2013 | Donald et al. | |
| 8,573,306 B2 | 11/2013 | Donald et al. | |
| 8,590,629 B2 | 11/2013 | Swietlik et al. | |
| 8,622,138 B2 | 1/2014 | Donald et al. | |
| 8,733,436 B2 | 5/2014 | Donald et al. | |
| 8,746,332 B2 | 6/2014 | Donald et al. | |
| 8,776,891 B2 | 7/2014 | Donald et al. | |
| 8,776,893 B2 | 7/2014 | Donald et al. | |

FOREIGN PATENT DOCUMENTS

| | | |
|---|---|---|
| WO | 2013/160687 A2 | 10/2013 |
| WO | 2014/096795 A1 | 6/2014 |
| WO | 2014096795 A1 | 6/2014 |

OTHER PUBLICATIONS

UK Examination Report dated Dec. 22, 2017, for Application No. GB 1617702.4.
UK IPO Examination Report dated Jul. 2, 2018, for Application No. GB16177021.4.

* cited by examiner

SELF-REGULATING FLOW CONTROL DEVICE

CROSS-REFERENCE TO RELATED APPLICATIONS

This application claims the benefit of U.S. Provisional Application No. 61/983,940 filed Apr. 24, 2014, which is incorporated herein by reference in its entirety for all purposes.

STATEMENT REGARDING FEDERALLY SPONSORED RESEARCH OR DEVELOPMENT

Not applicable.

BACKGROUND

The present disclosure relates to a self-regulating flow control device to be coupled into a conduit used in the exploration and production of hydrocarbons from a subsea well. In some cases, the self-regulating flow control device is used while injecting fluids into a subsea well. More particularly, the present disclosure includes use of a self-regulating flow control device to control the flow of injected fluid into a subsea well or flow-line via a tree, manifold, or other access point on the subsea infrastructure by responding to the injection pressure being applied to prevent the conduit from collapsing.

When injecting or pumping fluids into a reservoir and after the tubing head pressure has been overcome, the injection pressure can drop due to the momentum of the injected fluid. The drop in injection pressure can result from a sudden shut down in pumping with fluid momentum causing a vacuum effect. The drop in injection pressure can also result from the flow into the well being greater than the surface pump flow rate with the conduit used to connect the surface pump to the well becoming sub-hydrostatic. Conduit that is collapse resistant under water can be used; however, collapse resistant conduit is expensive.

SUMMARY

In an embodiment, a self-regulating flow control device includes a main body including a through bore, a cavity intersecting the through bore and angularly offset from the through bore, a piston comprising an aperture, and a biasing member. Moreover, in an unactuated position, the biasing member biases the piston such that the aperture is in the cavity. Further, in an actuated position, a pressure overcomes the biasing member to move the aperture into the through bore.

In an embodiment, a self-regulating flow control device includes a housing assembly having an upper through bore and a lower through bore, the upper through bore being disposed in an upper portion of the housing assembly and extending into an inner portion of the housing assembly. The self-regulating flow control device further includes a piston movable in the through bore, and a biasing member. Moreover, in an unactuated position, the biasing member biases the piston such that the upper through bore is isolated from the lower through bore. Further, in an actuated position, a pressure overcomes the biasing member to move the piston and expose the upper through bore to the lower through bore.

In an embodiment, a self-regulating flow control device includes a housing having a first through bore and a second through bore angularly offset from the first throughbore, a piston movable in the first through bore, and a biasing member. Moreover, in an unactuated position, the biasing member biases the piston such that the first through bore is isolated from the second through bore. Further, in an actuated position, a pressure overcomes the biasing member to move the piston and expose the first through bore to the second through bore.

The foregoing has outlined rather broadly the features of the disclosure such that the detailed description of the disclosure that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the disclosure. It should also be realized by those skilled in the art that such equivalent constructions do not depart from the spirit and scope of the disclosure as set forth in the appended claims.

BRIEF DESCRIPTION OF THE DRAWINGS

For a detailed description of embodiments of the disclosure, reference will now be made to the accompanying drawings in which.

DETAILED DESCRIPTION

Figure 1:
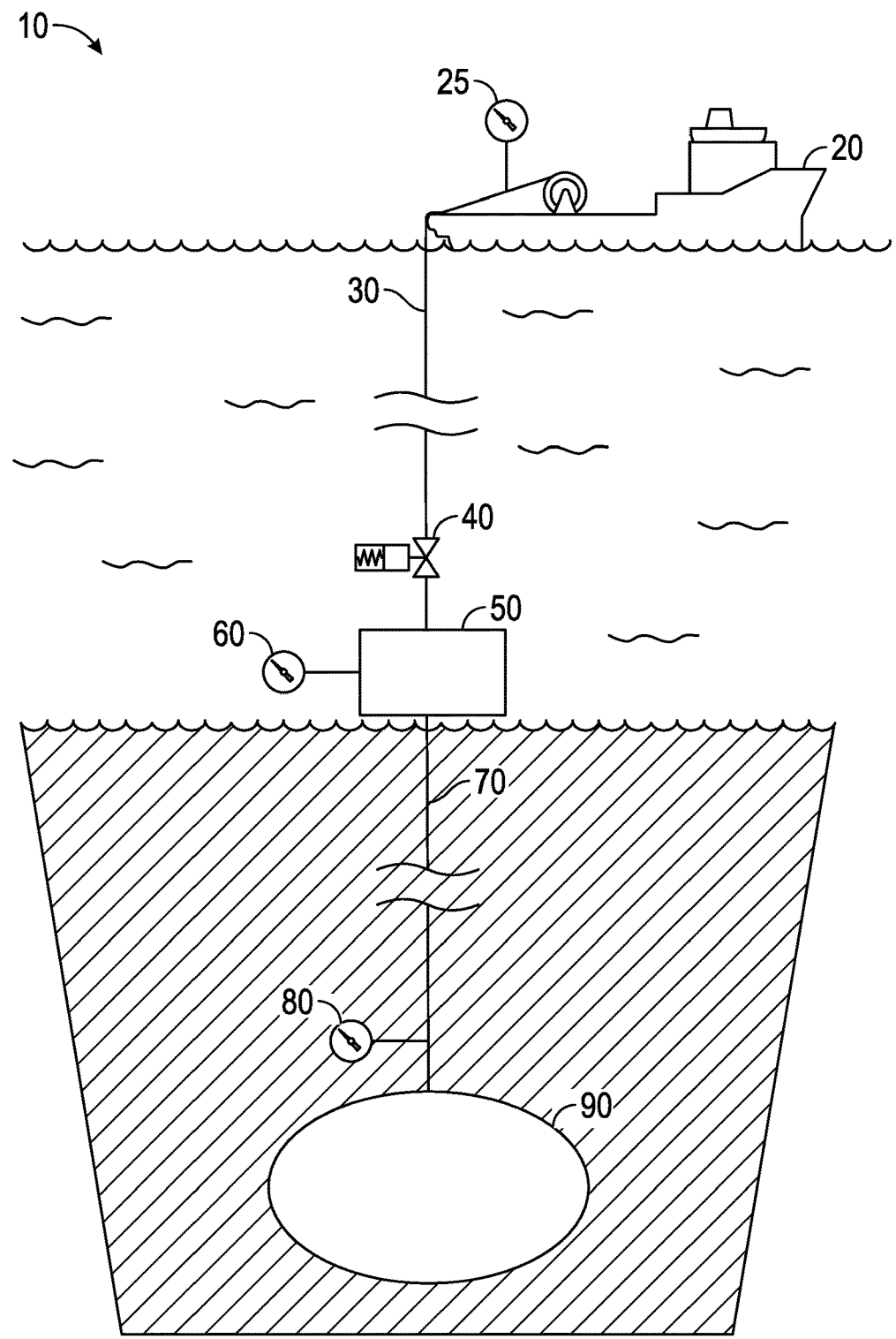
FIG. 1 is a schematic of an embodiment of a typical subsea well system standard in the art.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosures, including the claims, is limited to that embodiment.

Certain terms are used throughout the following description and claim to refer to particular system components. This document does not intend to distinguish between components that differ in name but not function. Moreover, the drawing figures are not necessarily to scale. Certain features of the invention may be shown exaggerated in scale or in somewhat schematic form, and some details of conventional elements may not be shown in the interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Still further, reference to "up" or "down" may be made for purposes of description with "up," "upper," "upward," or "above" meaning generally toward or closer to the surface of the earth or the sea, and with "down," "lower," "downward," or "below" meaning generally away or farther from the surface of the earth or the sea.

The use of a self-regulating flow control device in accordance with the present disclosure provides a device, a system, and a method for controlling the flow of fluid through a subsea well or flow-line via a tree, manifold, or other access point on the subsea infrastructure to prevent the conduit from collapsing. In some embodiments, the system and method are for controlling the flow of injected fluid into a subsea well or flow-line via a tree, manifold, or other access point on the subsea infrastructure by responding to the injection pressure being applied to prevent the conduit from collapsing.

Referring to FIG. 1, a schematic of a subsea well system 10, standard in the art, is shown. The subsea well system 10 comprises a vessel 20 with a topside pressure gauge 25. Conduit 30 extends from vessel 20 to the isolation valve 40 and then to the Christmas tree 50. The pressure gauge 60 is installed in the Christmas tree 50. Wellbore 70 extends from the Christmas tree 50 to well 90. Downhole pressure gauge 80 is installed in the tubing of wellbore 70.

Figure 2:
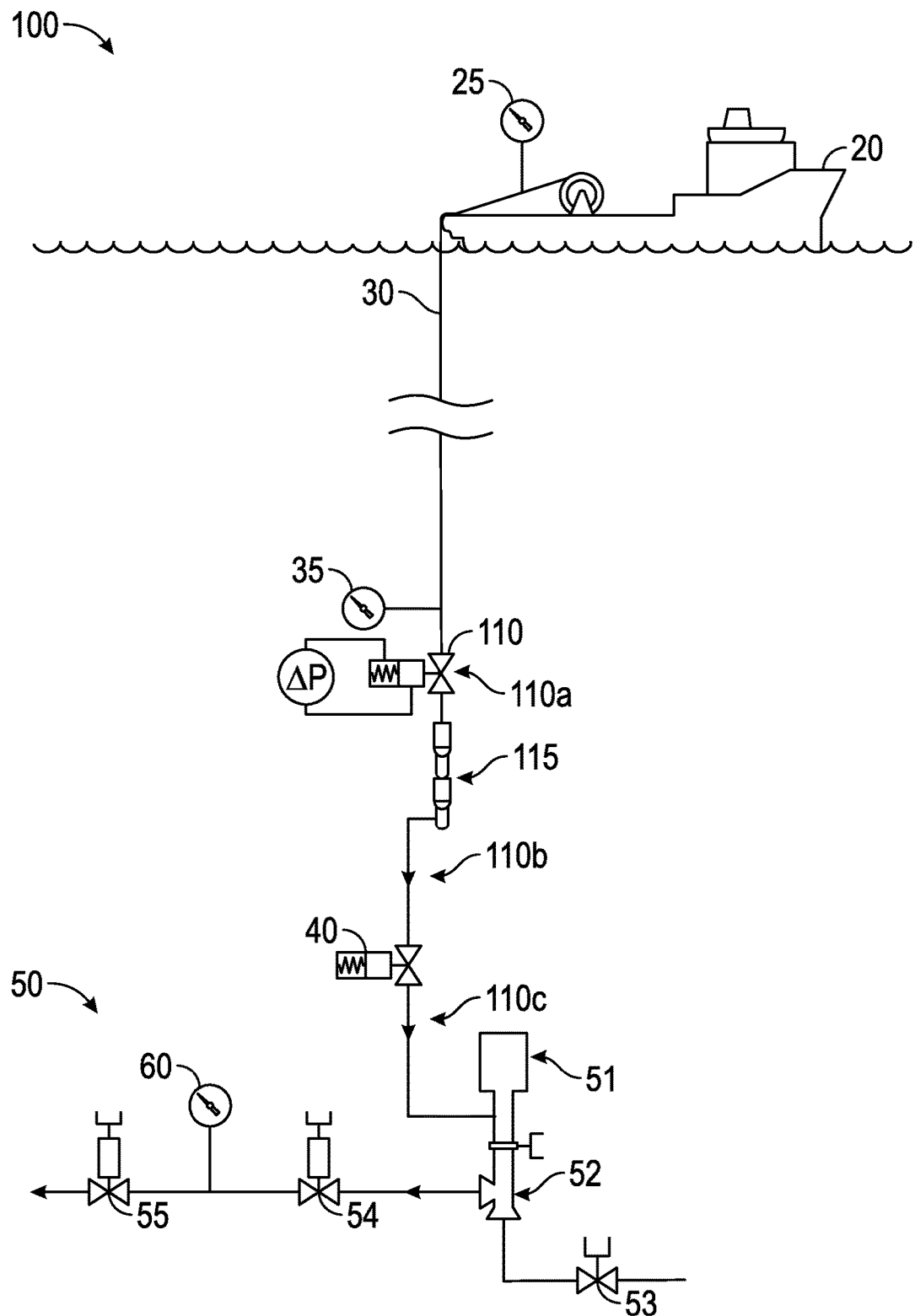
FIG. 2 is a schematic of an embodiment of a subsea well system in accordance with the principles described herein.

Referring to FIG. 2, a schematic of a subsea well system 100 with a self-regulating flow control device 110 is shown. The subsea well system 100 includes a vessel 20 with a topside pressure gauge 25. Conduit 30 extends from vessel 20 to the subsea Christmas tree 50. The pressure gauge 35, self-regulating flow control device 110, subsea hose connection 115, and an isolation valve 40 are coupled to conduit 30. The subsea hose connection 115 disconnects in case the vessel 20 loses control and breaks off. The Christmas tree 50 may include a multiple application reinjection system (MARS™) injection insert 51 such as described and claimed in one or more of U.S. Pat. Nos. 6,637,514, 6,823,941, 7,111,687, 7,992,633, 7,992,643, 8,066,063, 8,066,067, 8,066,076, 8,091,630, 8,104,541, 8,122,948, 8,167,049, 8,220,535, 8,272,435, 8,281,864, 8,297,360, 8,469,086, 8,540,018, 8,573,306, 8,622,138, 8,733,436, 8,746,332, 8,776,891, and/or 8,776,893, a production choke body 52, a flowline isolation valve 53, a production wing valve 54, a pressure gauge 60, and a production master valve 55. The Christmas tree 50 is in communication with the well (not shown). The self-regulating flow control device 110 may be disposed in one of a variety of locations, such as for example above the subsea hose connection 115 (shown in FIG. 2 at location 110a), below the subsea hose connection 115 and above the isolation valve 40 (shown in FIG. 2 at location 110b), or below the isolation valve 40 (shown in FIG. 2 at location 110c).

Figure 3A:
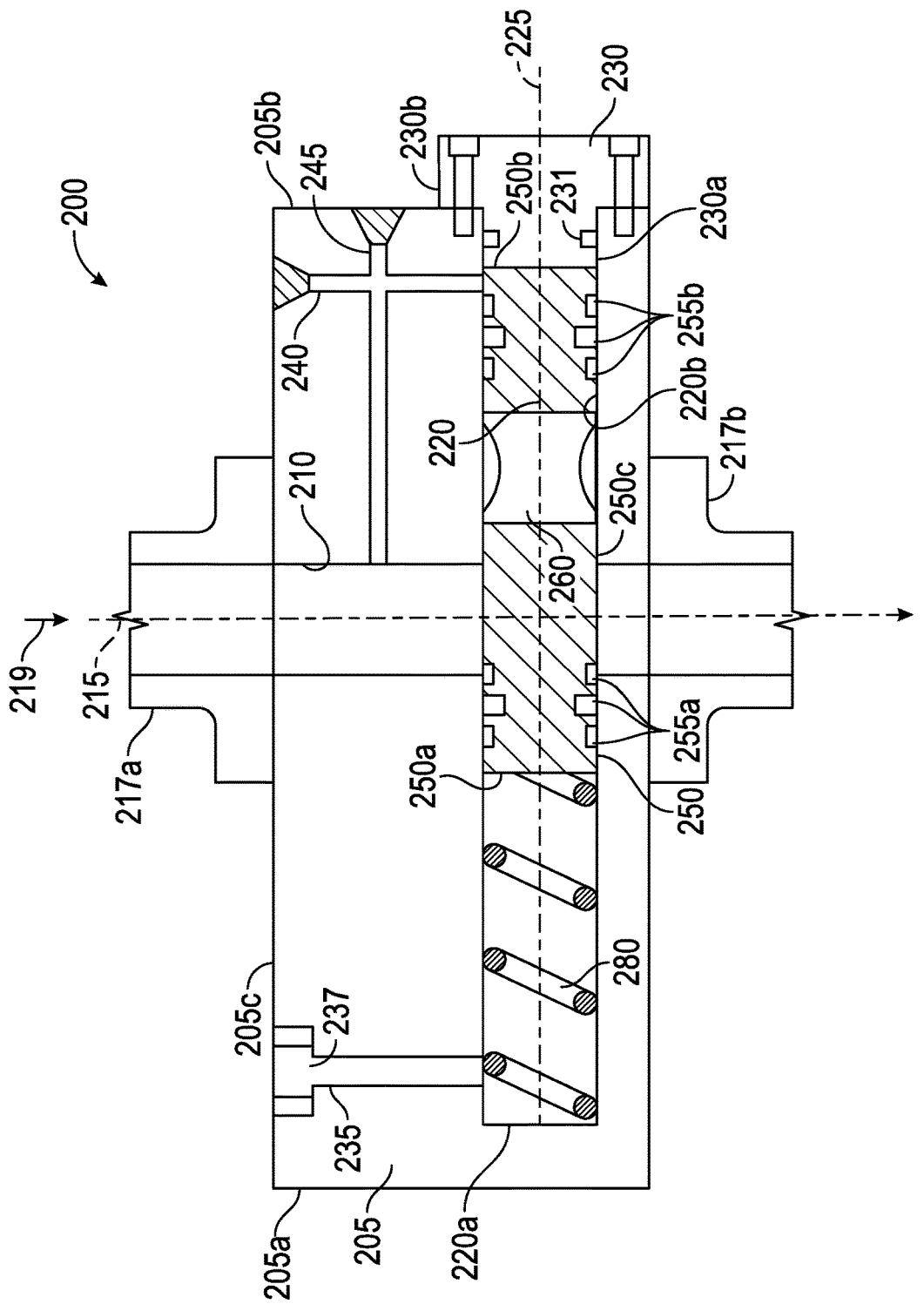
FIG. 3A is a partial cross sectional plan view of a first embodiment of a flow control system in a first position in accordance with the principles described herein.
Figure 3B:
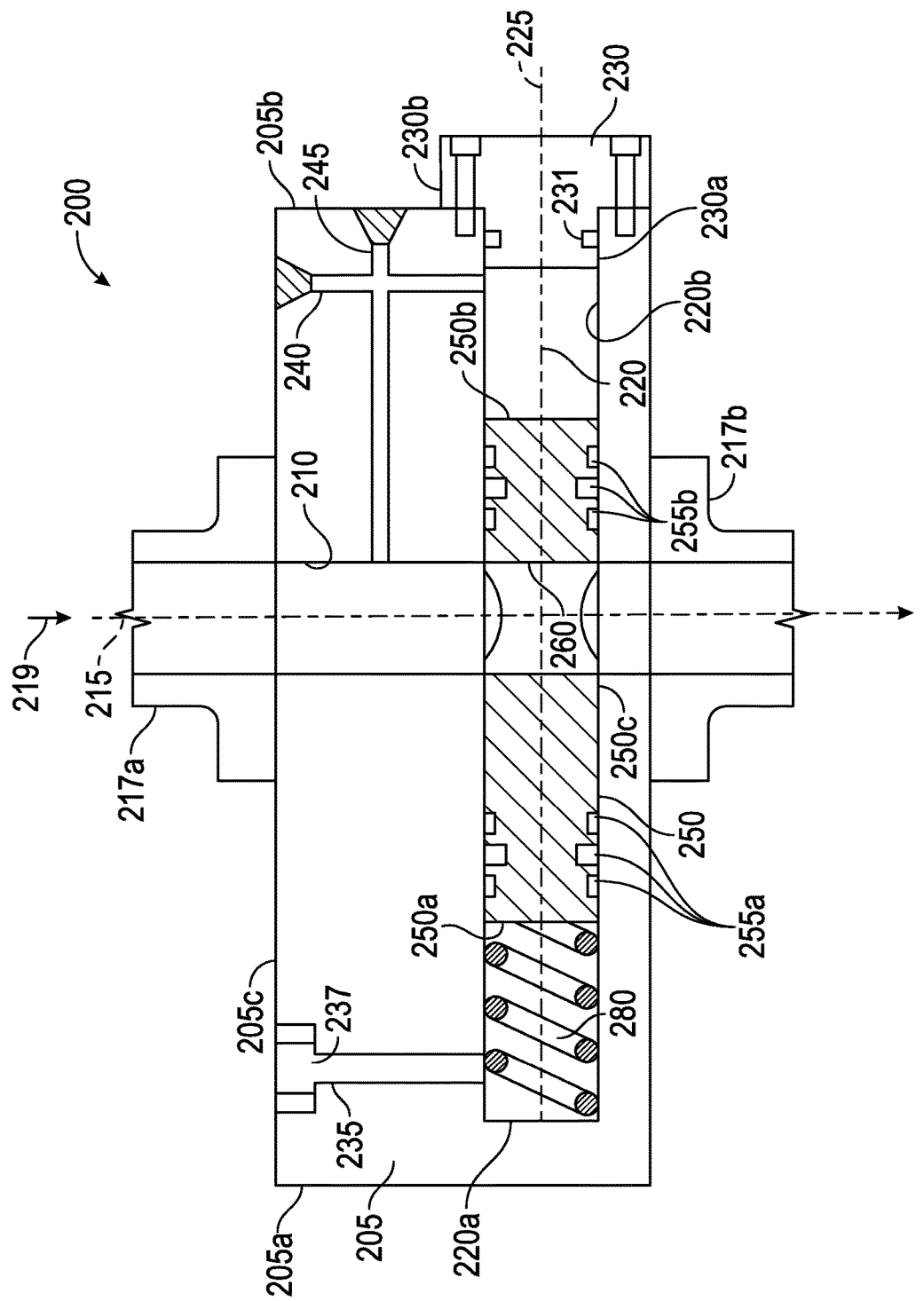
FIG. 3B is a partial cross sectional plan view of the flow control system of FIG. 3A in a second position.

Referring now to FIGS. 3A and 3B, an embodiment 200 of the self-regulating flow control device 110 of FIG. 2 is shown. The self-regulating flow control device 200 comprises a main body 205 having an upper surface 205c extending from a first end 205a to a second end 205b. The main body comprises a vertical through bore 210, a horizontal cylindrical cavity or bore 220, and an end cap 230; a piston or shuttle 250; and a biasing member 280. Main body 205 is disposed between and connected to an upper and a lower conduit 217a, 217b, respectively. Vertical through bore 210 has central axis 215 and is coaxial with conduits 217a, 217b. Vertical through bore 210 and conduits 217a, 217b have substantially similar diameters allowing for efficient fluid communication therebetween, such as in direction 219 from upper conduit 217a to main body 205, as shown. Horizontal cylindrical cavity or bore 220 has a central axis 225, an end 220a, and an inner cylindrical surface 220b that extends from end 220a to the second end 205b of main body 205. End cap 230 attachably connects to main body 205 at second end 205b. End cap 230 is substantially cylindrically shaped with a first outer cylindrical surface 230a having a smaller diameter than a second outer cylindrical surface 230b. The first outer cylindrical surface 230a of end cap 230 is sealingly disposed in cavity 220 with seal 231 disposed between first outer cylindrical surface 230a and inner cylindrical surface 220b of cavity 220.

Main body 205 of self-regulating flow control device 200 further comprises pressure communication paths or flow paths 235, 240, 245. A first flow path 235 is in fluid communication with cavity 220, extends vertically upward from cavity 220 to upper surface 205c of main body 205, and is proximal to first end 205a of main body 205. In an embodiment, flow path 235 vents to the atmosphere. A second flow path 240, also in fluid communication with cavity 220, extends vertically upward from cavity 220 to the upper surface 205c of main body 205, and is proximal to second end 205b of main body 205. Flow path 240 is further intersected by a third flow path 245, which extends horizontally from through bore 210 to the second end 205b of main body 205. Thus, second and third flow paths 240, 245, respectively, are in fluid communication with one another, and through bore 210 is in fluid communication with cavity 220 via flow paths 240, 245.

Referring still to FIGS. 3A and 3B, first flow path 235 further comprises a filter 237 to keep clean the fluid in contact with cavity end 220a, biasing member 280, and shuttle 250. In other embodiments, a compensation bladder may be used to keep fluid clean.

The shuttle 250 having a first end 250a opposite a second end 250b and an outer cylindrical surface 250c extending therebetween is slidingly disposed in horizontal cavity 220. A first and second group of seals 255a, 255b, respectively, are disposed on either end 250a, 250b, respectively, of shuttle 250. In the embodiment of FIGS. 3A and 3B, three annular seals 255a are disposed proximal to first shuttle end 250a and an additional three annular seals 255b are disposed proximal to second shuttle end 250b to provide seals between outer cylindrical surface 250c of shuttle 250 and cavity 220. Annular seals 255a, 255b may be made from an elastomeric material or from any other suitable sealing material. In other embodiments, fewer or more seals may be used. For example, in other embodiments, one, two, four or more seals may be employed proximal to each end 250a, 250b. The same number of seals 255a, 255b may be used at each end 250a, 250b, respectively, as shown in the described embodiment or, in other embodiments, a greater number of seals may be used proximal to end 250a than used proximal to end 250b. In yet other embodiments, a greater number of seals may be used proximal to end 250b than used proximal to end 250a.

The shuttle 250 further comprises a vertical through bore, aperture or cutout 260 disposed between the first group of seals 255a and the second group of seals 255b. Cutout 260 is shown in FIGS. 3A and 3B as coaxial with through bore 210. In some embodiments, cutout 260 has a diameter approximately equivalent to the diameter of through bore 210.

Referring still to FIGS. 3A and 3B, the shuttle 250 is axially biased by a biasing member 280. In the present embodiment, biasing member 280 is a compression spring. Thus, to axially displace the shuttle 250 toward cavity end 220a, fluid pressure applied to through bore 210, second and third flow paths 240, 245, respectively, and cavity 220 and acting on second shuttle end 250b must produce a force oppositely directed to, and greater than, the force exerted by spring 280. The spring 280 is axially compressed between cavity end 220a and first shuttle end 250a within cavity 220. The terms "horizontal" and "vertical" are used in the above discussion, and elsewhere throughout this disclosure, for ease and clarity of description. It is understood that these terms are not absolute, and may be understood relative to various reference points. In other words, the above-referenced flow bores and flow paths may be angularly offset from each other, and/or the axes 215 and 225 may be angularly offset from each other, and they are not necessarily "horizontal" or "vertical" with respect to a fixed point of reference such as the sea floor or sea surface.

Still referring to FIGS. 3A and 3B, in an unactuated state, where no pressure is acting through flow paths 235, 240, 245, the force of spring 280 causes the shuttle 250 to move toward end cap 230 such that cutout 260 is entirely within cavity 220 and there is no fluid communication from main body 205 to lower conduit 217b (see FIG. 3A). As pressure is applied down through bore 210, through second and third flow paths 240, 245, and into cavity 220, the increased pressure will eventually be greater than the combination of the hydrostatic or atmospheric pressure communicated through first flow path 235 and the force of spring 280. The shuttle 250 will thus be forced to slide toward cavity end 220a allowing a small portion of cutout 260 to overlap with through bore 210. As the pressure increases, the shuttle 250 slides farther toward cavity end 220a, increasing the amount of overlap of cutout 260 and through bore 210 and the flow in direction 219 from upper conduit 217a through main body 205 to lower conduit 217b.

Conversely, if there is a drop in the uphole pressure applied down through bore 210, the lower pressure will be communicated to second end 250b of shuttle 250. The shuttle 250 will start to slide toward end cap 230 as the pressure exerted on second shuttle end 250b becomes equivalent to the environmental pressure communicated through first flow path 235 to first shuttle end 250a. The shuttle 250 slides toward end cap 230, though the pressures acting on shuttle ends 250a, 250b are equivalent due to the force of spring 280, which is biased toward end cap 230. Thus, as the pressure drops, the overlap of cutout 260 and through bore 210 decreases.

Self-regulating flow device 200 thus prevents a vacuum from being drawn into the conduit system below during sudden decreases in uphole pressure by closing the overlap of cutout 260 and through bore 210 in proportion to the uphole pressure.

Figure 4A:
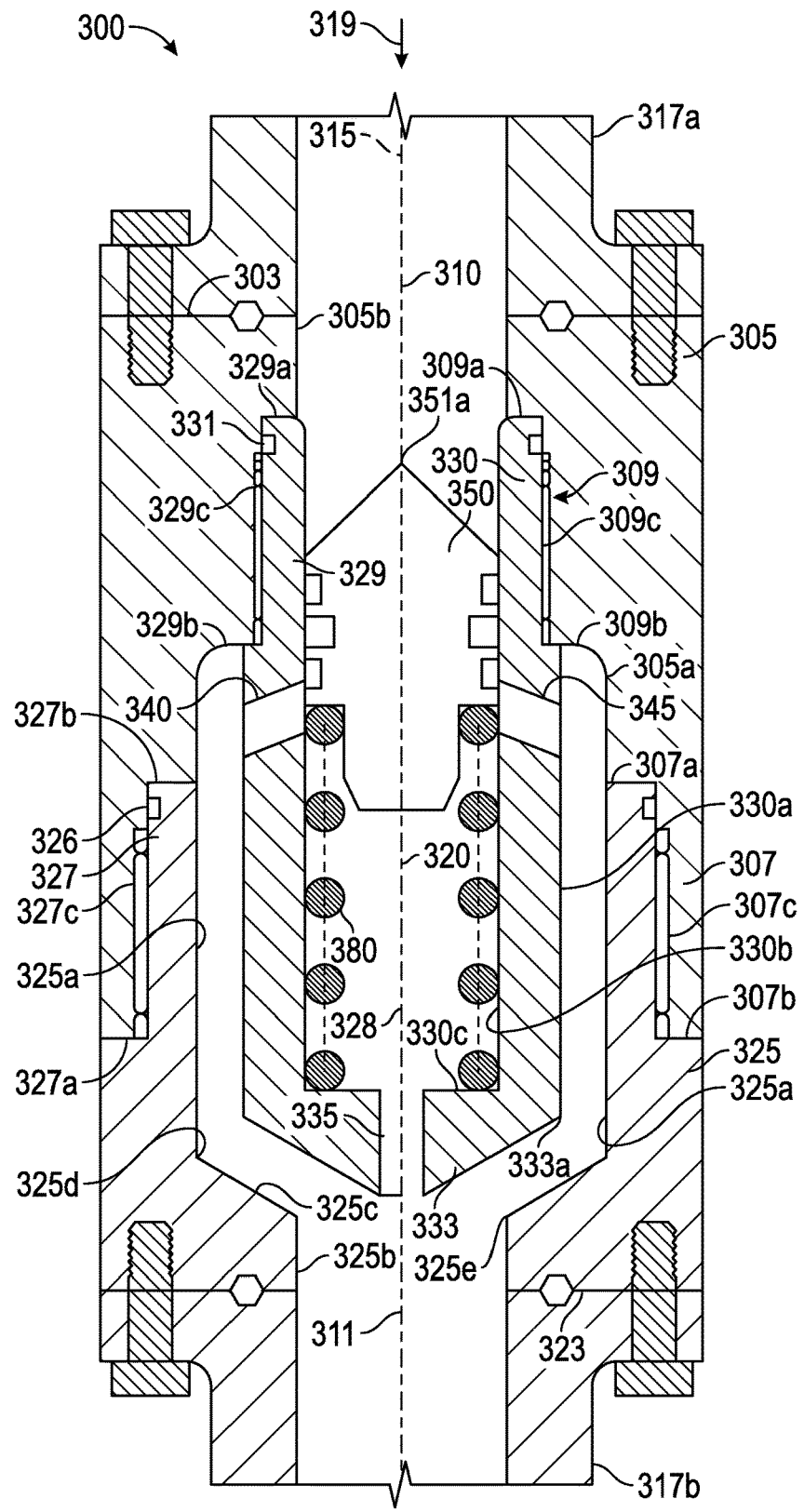
FIG. 4A is a partial cross sectional plan view of a second embodiment of a flow control system in a first position in accordance with the principles described herein.
Figure 4B:
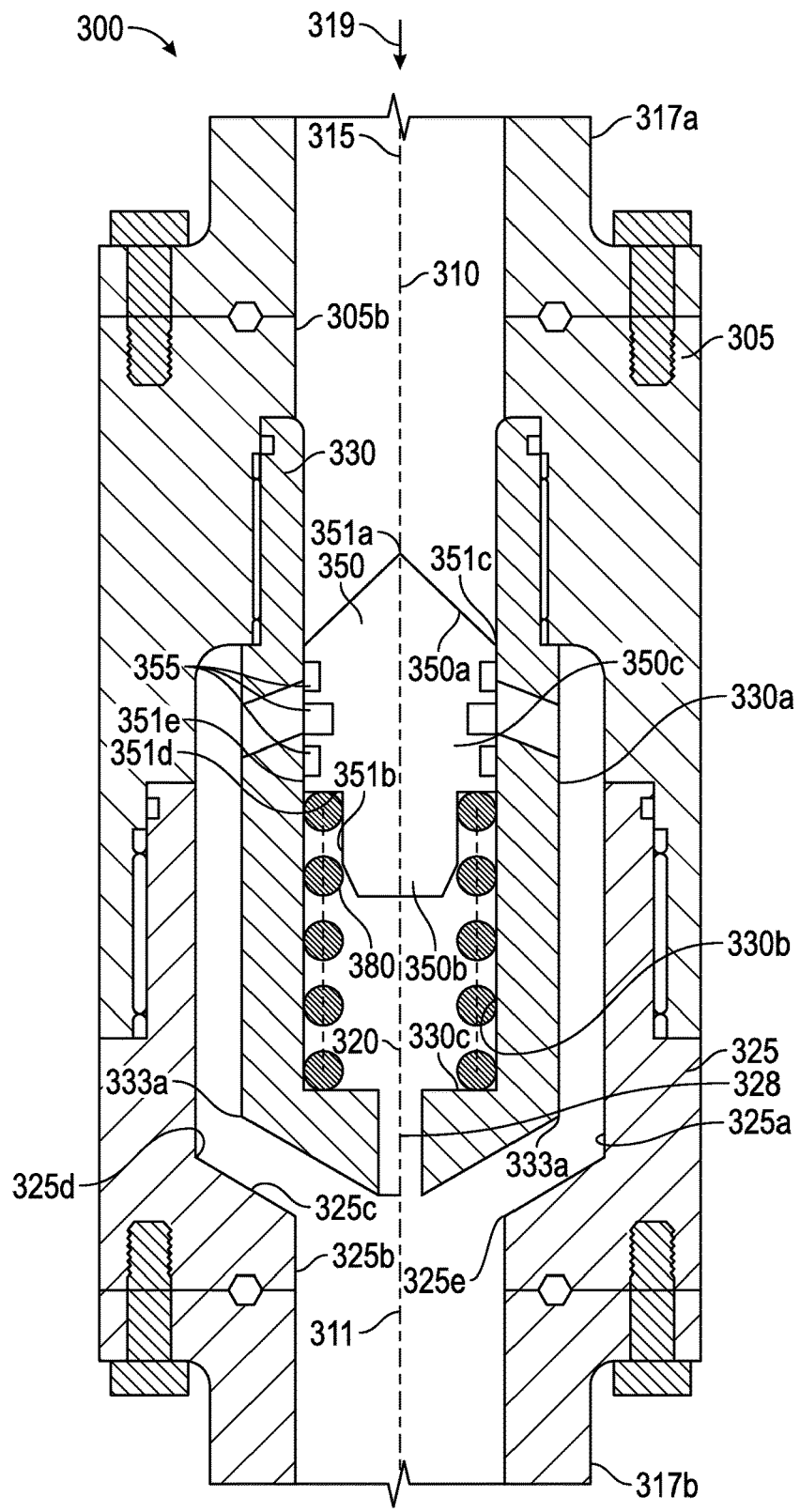
FIG. 4B is a partial cross sectional plan view of the flow control system of FIG. 4A in a second position.
Figure 4C:
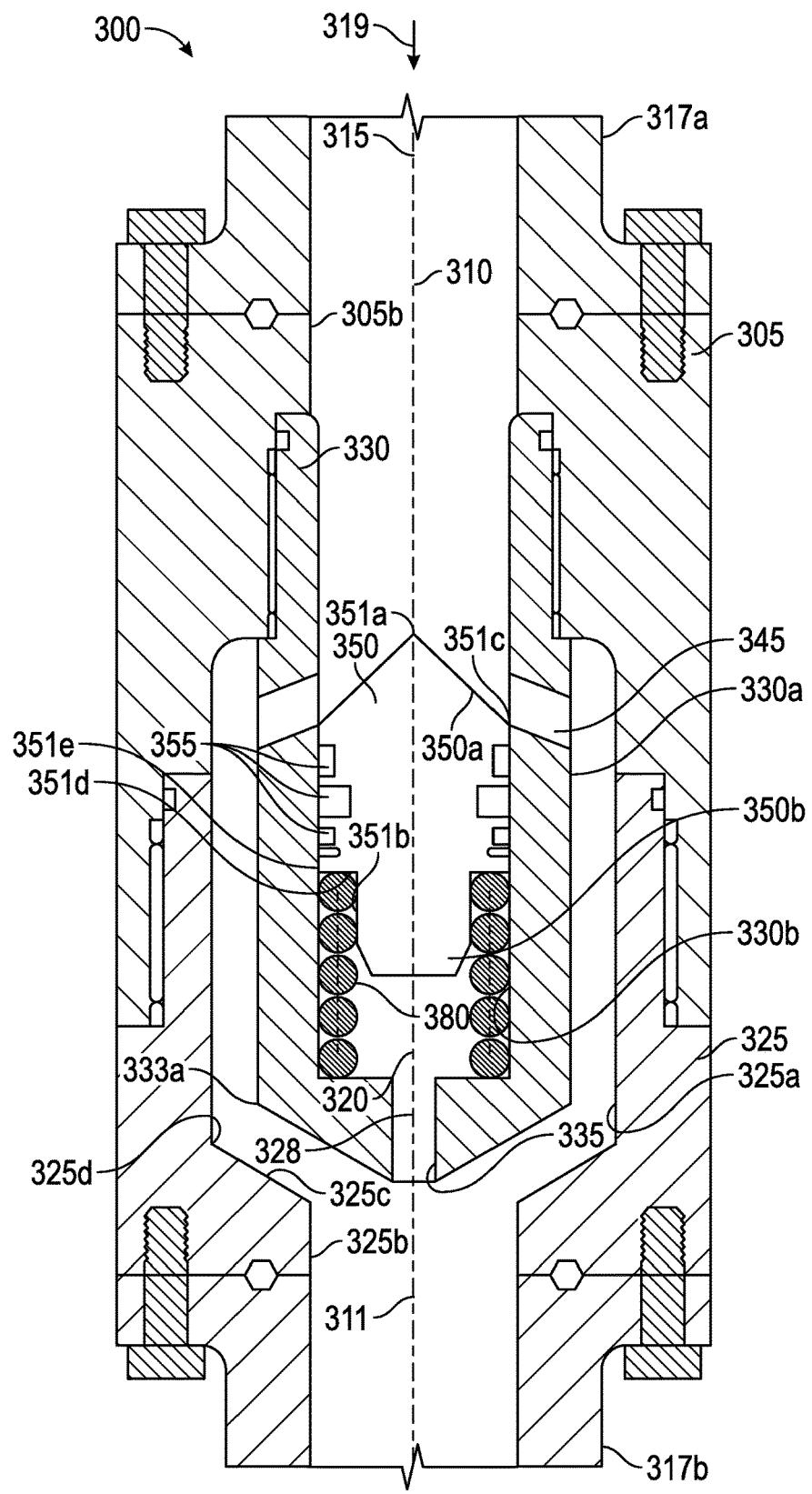
FIG. 4C is a partial cross sectional plan view of the flow control system of FIGS. 4A and 4B in a third position.

Referring now to FIGS. 4A-4C, an embodiment 300 of the self-regulating flow control device 110 of FIG. 2 is shown. The self-regulating flow control device 300 comprises an upper outer housing 305, a lower outer housing 325, an inner housing 330, a piston or shuttle 350, and a biasing member 380.

Upper outer housing 305 is generally tubular and extends axially downward along central axis 315 from an upper conduit 317a, threadedly attached to generally tubular and axially extending lower outer housing 325 and inner housing 330. Upper housing 305 comprises a top end 303, a lower threaded box end 307, and an upper threaded box joint 309. Lower threaded box end 307 comprises an inner annular shoulder 307a, outer annular end 307b, and inner cylindrical threaded surface 307c extending axially between shoulder 307a and end 307b. The upper threaded box joint 309 of the upper housing 305 has an inner annular shoulder 309a, outer annular shoulder 309b, and inner cylindrical threaded surface 309c extending axially between inner shoulder 309a and outer shoulder 309b. Outer annular shoulder 309b of upper threaded box end 309 is connected to lower threaded box end 307 by inner cylindrical surface 305a.

Upper outer housing 305 further comprises a vertical through bore 310 having central axis 315 and inner cylindrical surface 305b axially extending from top end 303 to shoulder 309a. Upper housing 305 is coaxial with upper and lower conduits 317a, 317b, respectively. Vertical through bore 310 and upper conduit 317a have substantially similar inner diameters allowing for efficient fluid communication in direction 319 from upper conduit 317a to upper housing 305.

Lower outer housing 325 comprises a tubular threaded pin end 327, a base 323, and a through bore 311. Threaded pin end 327 comprises an annular shoulder 327a, annular end 327b, and cylindrical threaded surface 327c extending axially between shoulder 327a and end 327b. Threaded pin end 327 further comprises an annular seal 326 disposed proximal to end 327b and between end 327b and cylindrical threaded surface 327c. Threaded pin end 327 comprises inner cylindrical surface 325a extending axially from end 327b to lower end 325d, forming a cavity 328.

Lower outer housing 325 further comprises a vertical through bore 311 that has a central axis 315 and an inner cylindrical surface 325b with an upper end 325e, and is coaxial with upper and lower conduits 317a, 317b, respectively, and upper housing 305. The lower end 325d of inner cylindrical surface 325a is connected to the upper end 325e of inner cylindrical surface 325b by internal inclined surface 325c, which forms a funnel-like geometry. Vertical through bore 311 and lower conduit 317b have substantially similar inner diameters allowing for efficient fluid communication in direction 319 from lower housing 325 to lower conduit 317b.

Still referring to FIGS. 4A-4C, inner housing 330 comprises tubular threaded pin end 329, conical base 333, and flow paths or ports 335, 340, 345. Threaded pin end 329 further comprises central axis 315, annular end 329a, annular shoulder 329b, and cylindrical threaded surface 329c extending axially between end 329a and shoulder 329b. Threaded pin end 329 also comprises an annular seal 331 disposed proximal to end 329a and between end 329a and cylindrical threaded surface 329c.

Inner housing 330 further comprises an outer cylindrical surface 330a axially extending from annular shoulder 329b to end point 333a of conical base 333, and an inner cylindrical surface 330b axially extending from annular end 329a to annular shoulder 330c of conical base 333, forming cavity 320. Conical base 333 taperingly extends from end point 333a axially downward and radially inward toward central axis 315.

Inner housing 330 further comprises pressure communication paths, ports, or flow paths 335, 340, 345. Flow path 335, in fluid communication with cavity 320 and through bore 311, extends vertically downward from shoulder 330c through conical base 333 along the central axis 315. Angular flow paths or ports 340, 345, respectively, are in fluid communication with cavity 328 and extend radially outward and axially downward at an angle toward cavity 328, and are proximal to annular shoulder 329b. In an embodiment, the angle of flow paths 340, 345 is between fifteen and thirty degrees. Angular flow paths 340, 345 may be in fluid communication with cavity 320 or through bore 310 depending on the position of shuttle 350 (to be discussed in further detail below; see FIGS. 4A and 4C). Further, the quantity of angular flow paths may be decreased or increased as desired; for example a single angular flow path or three or more angular flow paths may be used.

Still referring to FIGS. 4A-4C, self-regulating flow control device 300 further comprises a conical shuttle or piston 350 slidingly disposed in vertical cavity 320 and having a central axis 315. Conical shuttle 350 comprises a conical upper end 350a having an upper point 351a; a cylindrical lower end 350b; and a middle portion 350c. The middle portion 350c is disposed between upper and lower ends 350a, 350b, and comprises an upper end 351c, an annular shoulder 351d, and an outer cylindrical surface 351e. Conical upper end 350a taperingly extends from upper end 351c of middle portion 350c axially upward along central axis 315 and radially inward toward upper point 351a, forming a cone shape. Cylindrical lower end 350b has a smaller outer diameter than middle portion 350c and extends axially downward from annular shoulder 351d.

Conical shuttle 350 further comprises three annular seals 355 disposed on outer cylindrical surface 351e of middle portion 350c that provide a seal between outer cylindrical surface 351e of shuttle 350 and the inner cylindrical surface 330b of inner housing 330. Annular seals 355 may be made from an elastomeric material or from any other suitable sealing material. In other embodiments, fewer or more seals may be used. For example, in other embodiments, one or two seals 355 may be employed on outer cylindrical surface 350c. In yet other embodiments, four or more seals 355 may be employed on outer cylindrical surface 350c. If more than one seal 355 is employed, the seals may, but need not, be spaced equidistantly from one another.

Conical shuttle 350 is axially biased by a biasing member 380. In the present embodiment, biasing member 380 is a compression spring. Thus, to axially displace the shuttle 350 downward toward shoulder 330c, fluid pressure applied to through bore 310 and cavity 320 and acting on conical upper shuttle end 350a must produce a force oppositely directed to, and greater than, the force exerted by spring 380. The spring 380 is axially compressed between annular shoulder 351d of conical shuttle 350 and annular shoulder 330c of inner housing 330 within cavity 320.

Still referring to FIGS. 4A-4C, in an unactuated state, where the uphole pressure (above self-regulating flow control device 300) is equivalent to the downhole pressure (below device 300), the force of spring 380 causes the shuttle 350 to move upward such that there is no fluid communication from conduit 317a to lower conduit 317b (see FIG. 4A). As the pressure applied down through bore 310 increases, the increased pressure will eventually be greater than the combination of the downhole pressure communicated through bore hole 311 and the force of spring 380. The shuttle 350 will thus be forced to slide down toward annular shoulder 330c (see FIG. 4B). As the uphole pressure continues to increase, forcing spring 380 to compress farther and the shuttle 350 to slide down farther, the shuttle will begin to expose flow paths 340, 345, allowing fluid communication from through bore 310 to flow paths 340, 345 and cavity 328. As the pressure increases, the shuttle 350 slides farther down toward shoulder 330c, eventually completely exposing flow paths 340, 345 such that the upper end 351c of shuttle 350 is below the flow paths 340, 345 (see FIG. 4C). In addition, as the shuttle 350 is sliding down, the fluid in cavity 320 will be displaced through flow path 335 and into through bore 311 and then conduit 317b.

Conversely, if there is a drop in uphole pressure, the lower pressure would be communicated to the top of conical shuttle 350. The shuttle 350 will start to slide up as the pressure exerted uphole becomes equivalent to or less than the pressure exerted downhole. The shuttle 350 slides up though the uphole and downhole pressures acting on shuttle 350 are equivalent due to the force of spring 380, which is biased upward away from shoulder 330c. Thus, as the pressure drops, the spring 380 forces shuttle 350 upward until flow paths 340, 345 are no longer open to fluid communication between through bore 310 and through bore 311 (see FIGS. 4A and 4B).

Self-regulating flow device 300 thus prevents a vacuum from being drawn into the conduit system below during sudden decreases in uphole pressure by blocking or closing flow paths 340, 345.

Figure 5A:
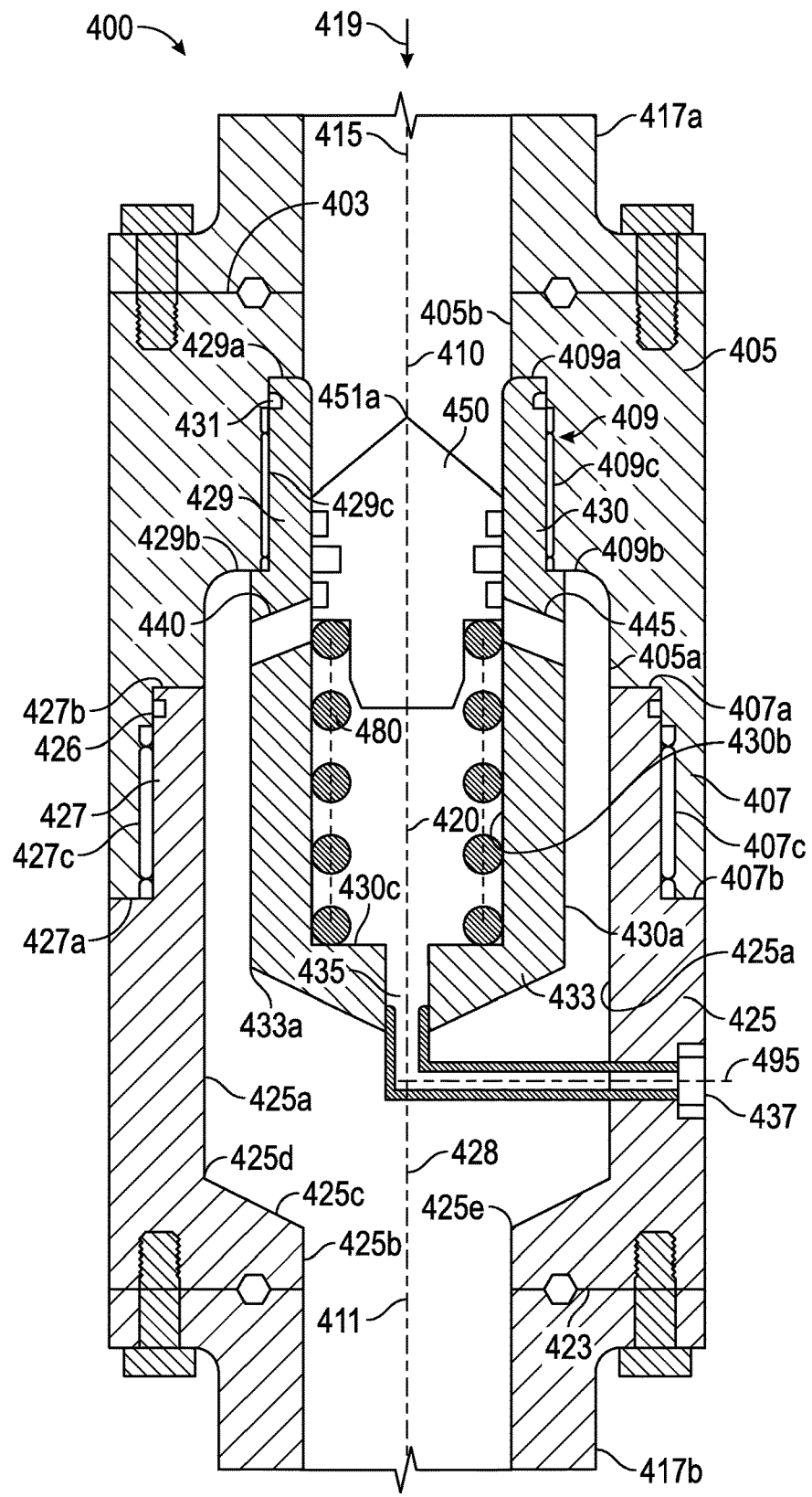
FIG. 5A is a partial cross sectional plan view of a third embodiment of a flow control system in a first position in accordance with the principles described herein.
Figure 5B:
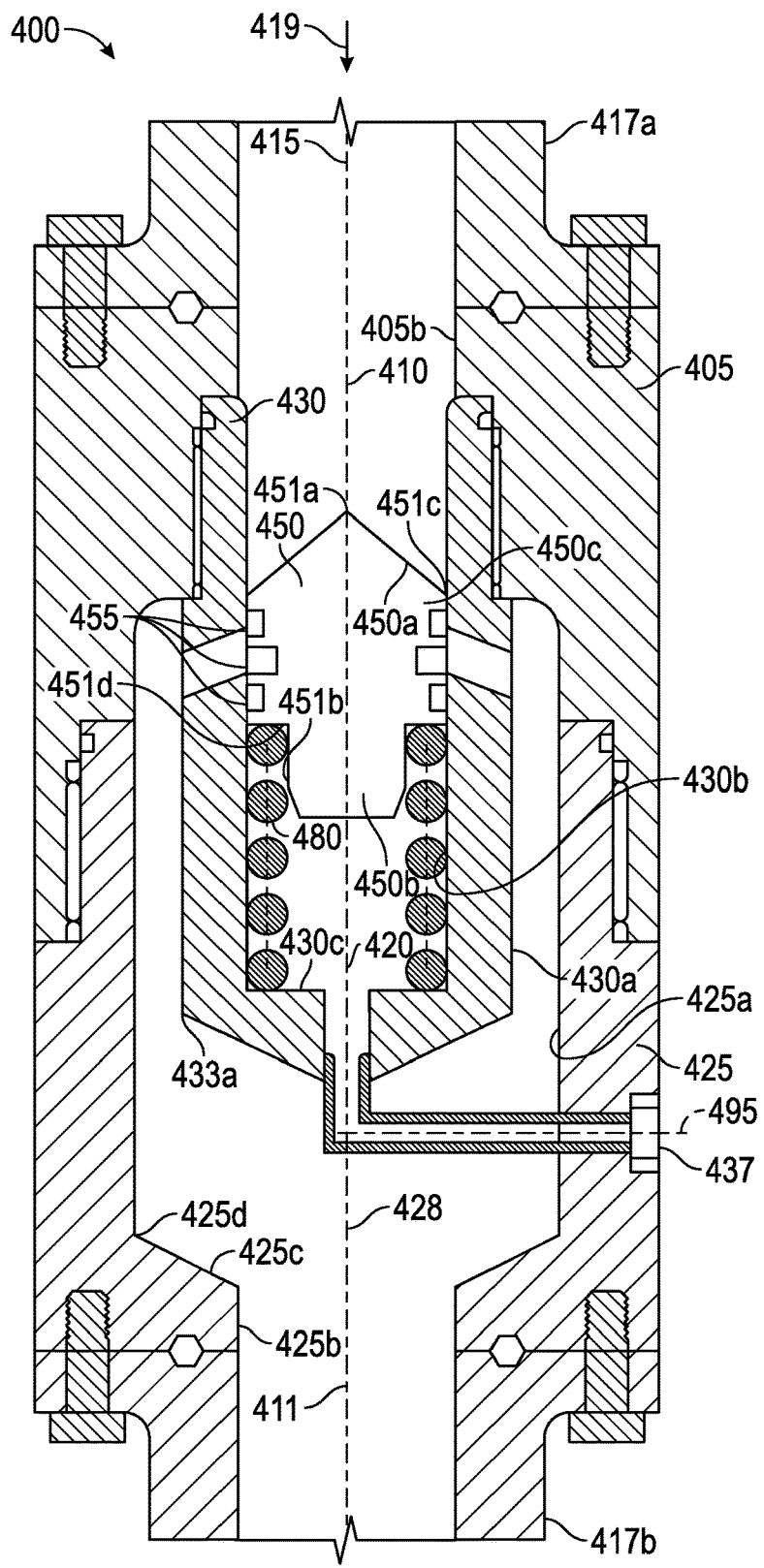
FIG. 5B is a partial cross sectional plan view of the flow control system of FIG. 5A in a second position.
Figure 5C:
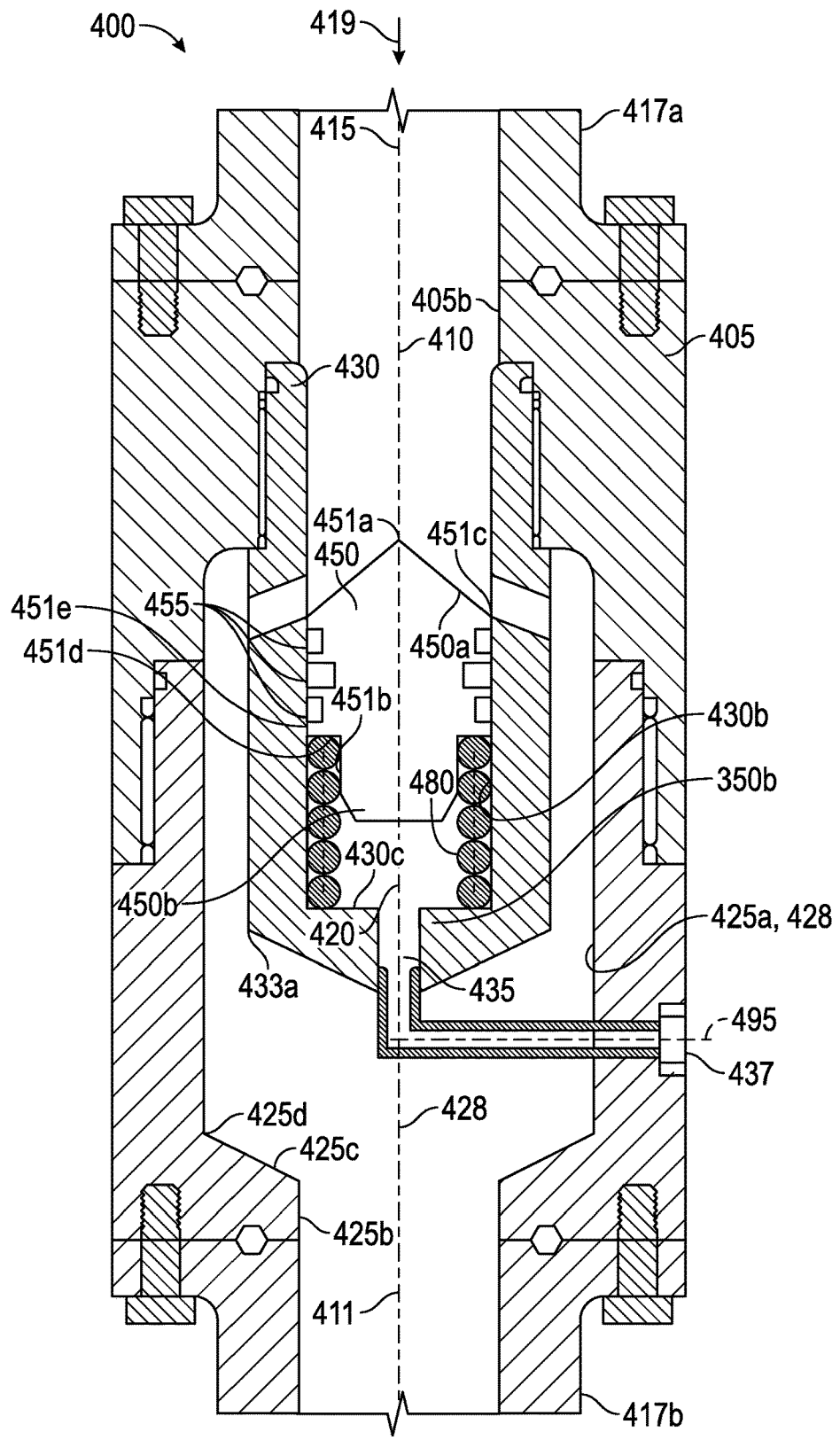
FIG. 5C is a partial cross sectional plan view of the flow control system of FIGS. 5A and 5B in a third position.

Referring now to FIGS. 5A-5C, an embodiment 400 of the self-regulating flow control device 110 of FIG. 2 is shown. The self-regulating flow control device 400 is substantially similar to device 300 previously described. Similar reference numerals are used where possible. Self-regulating control device 400 comprises an upper outer housing 405, a lower outer housing 425, an inner housing 430, a piston or shuttle 450, and a biasing member 480.

Upper outer housing 405 is generally tubular and extends axially downward along central axis 415 from an upper conduit 417a, threadedly attached to generally tubular and axially extending lower outer housing 425 and inner housing 430. Upper housing 405 comprises a top end 403, a lower threaded box end 407, and an upper threaded box joint 409. Lower threaded box end 407 comprises an inner annular shoulder 407a, outer annular end 407b, and inner cylindrical threaded surface 407c extending axially between shoulder 407a and end 407b. The upper threaded box joint 409 of the upper housing 405 has an inner annular shoulder 409a, outer annular shoulder 409b, and inner cylindrical threaded surface 409c extending axially between inner shoulder 409a and outer shoulder 409b. Outer annular shoulder 409b of upper threaded box end 409 is connected to lower threaded box end 407 by inner cylindrical surface 405a.

Upper outer housing 405 further comprises a vertical through bore 410 having central axis 415 and inner cylindrical surface 405*b* axially extending from top end 403 to shoulder 409*a*. Upper housing 405 is coaxial with upper and lower conduits 417*a*, 417*b*, respectively. Vertical through bore 410 and upper conduit 417*a* have substantially similar inner diameters allowing for efficient fluid communication in direction 419 from upper conduit 417*a* to upper housing 405.

Lower outer housing 425 comprises a tubular threaded pin end 427, a base 423, and a through bore 411. Threaded pin end 427 comprises an annular shoulder 427*a*, annular end 427*b*, and cylindrical threaded surface 427*c* extending axially between shoulder 427*a* and end 427*b*. Threaded pin end 427 further comprises an annular seal 426 disposed proximal to end 427*b* and between end 427*b* and cylindrical threaded surface 427*c*. Threaded pin end 427 comprises inner cylindrical surface 425*a* extending axially from end 427*b* to lower end 425*d*, forming a cavity 428.

Lower outer housing 425 further comprises a vertical through bore 411 that has a central axis 415 and an inner cylindrical surface 425*b* with an upper end 425*e*, and is coaxial with upper and lower conduits 417*a*, 417*b*, respectively, and upper housing 405. The lower end 425*d* of inner cylindrical surface 425*a* is connected to the upper end 425*e* of inner cylindrical surface 425*b* by internal inclined surface 425*c*, which forms a funnel-like geometry. Vertical through bore 411 and lower conduit 417*b* have substantially similar inner diameters allowing for efficient fluid communication in direction 419 from lower housing 425 to lower conduit 417*b*.

Still referring to FIGS. 5A-5*c*, inner housing 430 comprises tubular threaded pin end 429, conical base 433, and flow paths 435, 440, 445. Threaded pin end 429 further comprises central axis 415, annular end 429*a*, annular shoulder 429*b*, and cylindrical threaded surface 429*c* extending axially between end 429*a* and shoulder 429*b*. Threaded pin end 429 also comprises an annular seal 431 disposed proximal to end 429*a* and between end 429*a* and cylindrical threaded surface 429*c*.

Inner housing 430 further comprises an outer cylindrical surface 430*a* axially extending from annular shoulder 429*b* to end point 433*a* of conical base 433, and an inner cylindrical surface 430*b* axially extending from annular end 429*a* to annular shoulder 430*c* of conical base 433, forming cavity 420. Conical base 433 taperingly extends from end point 433*a* axially downward and radially inward toward central axis 415.

Inner housing 430 further comprises pressure communication paths, ports, or flow paths 435, 440, 445. Lower flow path 435 is in fluid communication with cavity 420 and the external hydrostatic or atmospheric pressure. Lower flow path 435 extends vertically downward from shoulder 430*c* through conical base 433 along the central axis 415. Lower flow path 435 then extends laterally from central axis 415 along central axis 495. Angular flow paths or ports 440, 445, respectively, are in fluid communication with cavity 428 and extend radially outward and axially downward at an angle toward cavity 428, and are proximal to annular shoulder 429*b*. In an embodiment, the angle of the flow paths 440, 445 is between fifteen and thirty degrees. Angular flow paths 440, 445 may be in fluid communication with cavity 420 or through bore 410 depending on the position of shuttle 450 (to be discussed in further detail below; see FIGS. 5A and 5C). Further, the quantity of angular flow paths may be decreased or increased as desired; for example a single angular flow path or three or more angular flow paths may be used.

Flow path 435 further comprises a filter 437 to keep clean the fluid in contact with cavity 420, biasing member 480, and cylindrical lower end 350*b* of shuttle 450. In other embodiments, a compensation bladder may be used to keep fluid clean.

Still referring to FIGS. 5A-5C, self-regulating flow control device 400 further comprises a conical shuttle or piston 450 slidingly disposed in vertical cavity 420 and having a central axis 415. Conical shuttle 450 comprises a conical upper end 450*a* having an upper point 451*a*; a cylindrical lower end 450*b*; and a middle portion 450*c*. The middle portion 450*c* is disposed between upper and lower ends 450*a*, 450*b*, and comprises an upper end 451*c*, an annular shoulder 451*d*, and an outer cylindrical surface 451*e*. Conical upper end 450*a* taperingly extends from upper end 451*c* of middle portion 450*c* axially upward along central axis 415 and radially inward toward upper point 451*a*, forming a cone shape. Cylindrical lower end 450*b* has a smaller outer diameter than middle portion 450*c* and extends axially downward from annular shoulder 451*d*.

Conical shuttle 450 further comprises three annular seals 455 disposed on outer cylindrical surface 451*e* of middle portion 450*c* that provide a seal between outer cylindrical surface 451*e* of shuttle 450 and the inner cylindrical surface 430*b* of inner housing 430. Annular seals 455 may be made from an elastomeric material or from any other suitable sealing material. In other embodiments, fewer or more seals may be used. For example, in other embodiments, one or two seals 455 may be employed on outer cylindrical surface 450*c*. In yet other embodiments, four or more seals 455 may be employed on outer cylindrical surface 450*c*. If more than one seal 455 is employed, the seals may, but need not, be spaced equidistantly from one another.

Conical shuttle 450 is axially biased by a biasing member 480. In the present embodiment, biasing member 480 is a compression spring. Thus, to axially displace the shuttle 450 downward toward shoulder 430*c*, fluid pressure applied to through bore 410 and cavity 420 and acting on conical upper shuttle end 450*a* must produce a force oppositely directed to, and greater than, the force exerted by spring 480. The spring 480 is axially compressed between annular shoulder 451*d* of conical shuttle 450 and annular shoulder 430*c* of inner housing 430 within cavity 420.

Still referring to FIGS. 5A-5C, in an unactuated state, where the uphole pressure (above self-regulating flow control device 400) is equivalent to the atmospheric pressure (below device 400), the force of spring 480 causes the shuttle 450 to move upward such that there is no fluid communication from conduit 417*a* to lower conduit 417*b* (see FIG. 5A). As the pressure applied down through bore 410 increases, the increased pressure will eventually be greater than the combination of the atmospheric pressure communicated through flow path 435 and the force of spring 480. The shuttle 450 will thus be forced to slide down toward annular shoulder 430*c* (see FIG. 5B). As the uphole pressure continues to increase, forcing spring 480 to compress farther and the shuttle 450 to slide down farther, the shuttle will begin to expose flow paths 440, 445, allowing fluid communication from through bore 410 to flow paths 440, 445 and cavity 428. As the pressure increases, the shuttle 450 slides farther down toward shoulder 430*c*, eventually completely exposing flow paths 440, 445 such that the upper end 451*c* of shuttle 450 is below the flow paths 440, 445 (see FIG. 5C). In addition, as the shuttle 450 is sliding down, the fluid in cavity 420 will be displaced through flow path 435.

Conversely, if there is a drop in uphole pressure, the lower pressure would be communicated to the top of conical shuttle 450. The shuttle 450 will start to slide up as the pressure exerted uphole becomes equivalent to or less than the atmospheric pressure. The shuttle 450 slides up though the uphole and atmospheric pressures acting on shuttle 450 are equivalent due to the force of spring 480, which is biased upward away from shoulder 430c. Thus, as the pressure drops, the spring 480 forces shuttle 450 upward until flow paths 440, 445 are no longer open to fluid communication between through bore 410 and through bore 411 (see FIGS. 5A and 5B).

Self-regulating flow device 400 thus prevents a vacuum from being drawn into the conduit system below during sudden decreases in uphole pressure by blocking or closing flow paths 440, 445.

Figure 6A:
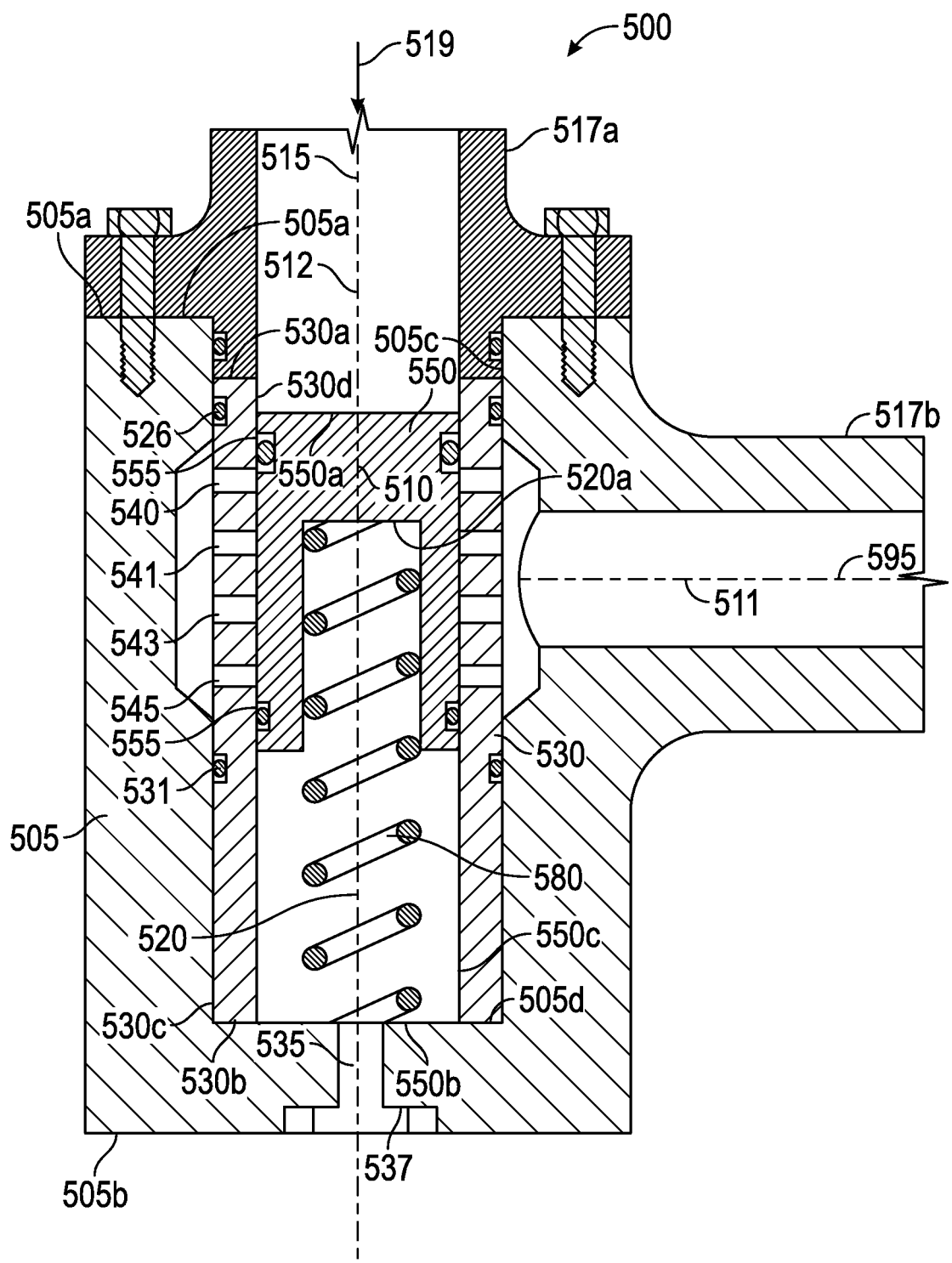
FIG. 6A is a partial cross sectional plan view of a fourth embodiment of a flow control system in a first position in accordance with the principles described herein.
Figure 6B:
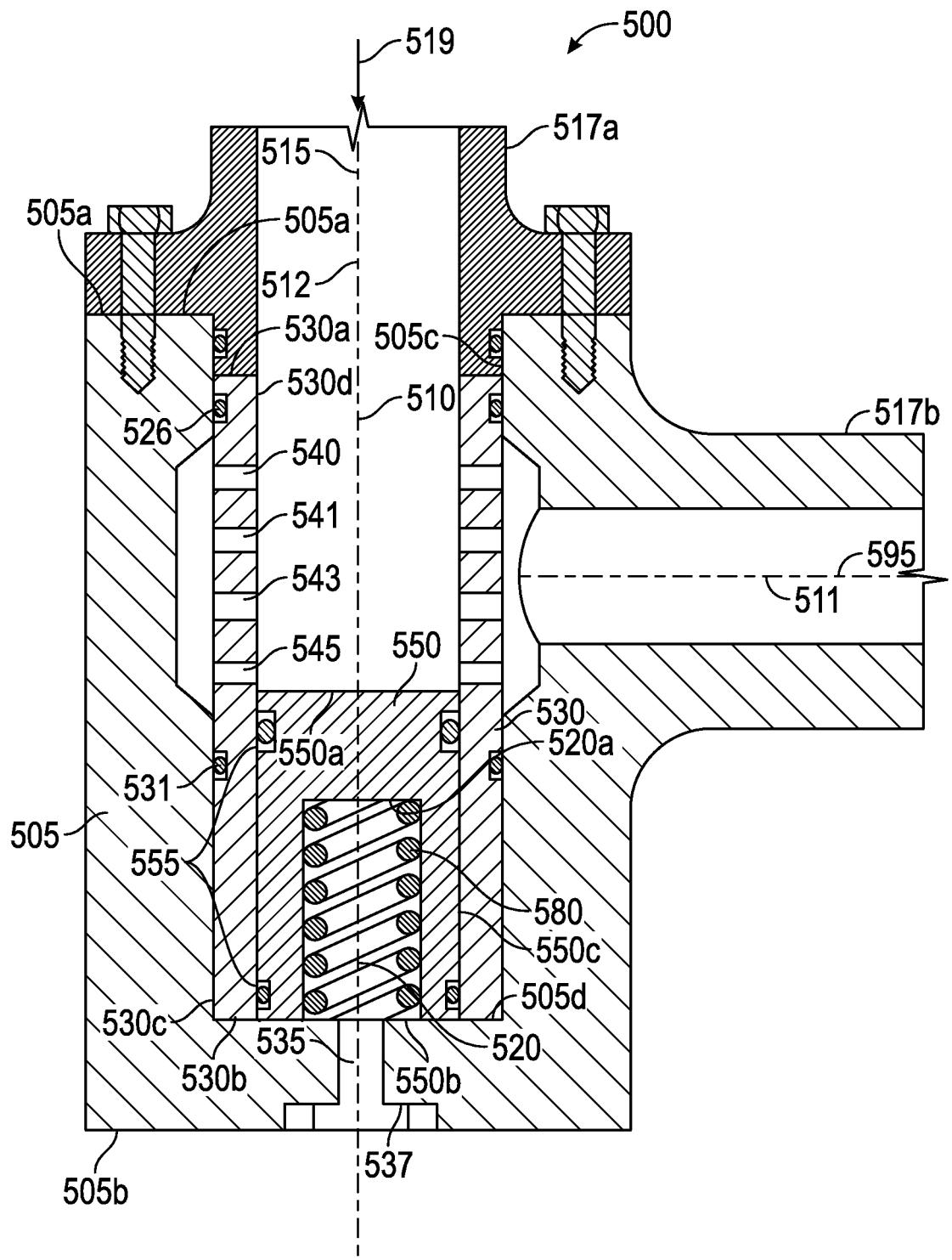
FIG. 6B is a partial cross sectional plan view of the flow control system of FIG. 6A in a second position.

Referring now to FIGS. 6A and 6B, an embodiment 500 of the self-regulating flow control device 110 of FIG. 2 is shown. The self-regulating flow control device 500 comprises an outer housing 505, an inner housing 530, a piston 550, and a biasing member 580. Outer housing 505 is generally tubular, axially extends along central axis 515, is disposed vertically below upper conduit 517a and horizontally adjacent to conduit 517b. Outer housing 505 comprises a top end 505a; a bottom end 505b; and a vertical bore or cavity 510 having central axis 515 and an inner cylindrical surface 505c axially extending from top end 505a to base 505d.

Still referring to FIGS. 6A and 6B, inner housing 530 is generally tubular, disposed coaxial with outer housing 505, extends axially along central axis 515, vertically below upper conduit 517a and horizontally adjacent to conduit 517b. Inner housing 530 further comprises an upper end 530a; a lower end 530b; an outer cylindrical surface 530c extending axially from upper end 530a to lower end 530b; and an inner cylindrical surface 530d extending axially from upper end 530a to lower end 530b. Outer housing 505 is coaxial with conduit 517a. Inner housing 530 and conduit 517a have substantially similar inner diameters allowing for efficient fluid communication in direction 519 from upper conduit 517a to the inner housing 530. In addition, the outer diameter 530c of inner housing 530 is slightly smaller than inner diameter 505c of outer housing 505 to allow the inner housing 530 to sealingly slide into outer housing 505. Seals 526, 531 provide a seal between the inner and outer housings 530, 505. Seal 526 is disposed on outer cylindrical surface 530c proximal to top end 530a. Seal 531 is disposed on outer cylindrical surface 530c proximal to seal 545.

The self-regulating flow control device 500 further comprises pressure communication paths, ports, or flow paths 535, 540, 541, 543, 545, which are generally tubular conduits. Flow path 535, in fluid communication with external atmospheric or hydrostatic pressure, extends vertically downward from cavity or through bore 512 through outer housing 505 along the central axis 515. Flow paths or ports 540, 541, 543, 545 are in fluid communication with cavity 512 and conduit 517a; and extend laterally from the central axis 515 proximal the portion of inner housing 530 adjacent to conduit 517b. Flow paths 540, 541, 543, 545 comprise horizontal through bores and may, but need not, be spaced equidistantly from one another. Flow paths 540, 541, 543, 545 may be in fluid communication, be partially in fluid communication, or not in communication at all, with cavity 512 and conduits 517a, 517b depending on the position of shuttle 550 (to be discussed in further detail below). Further, the quantity of flow paths may be decreased or increased as desired; for example, a single angular flow path or five or more flow paths may be used.

Conduit 517b is angularly offset from conduit 517a, or in some embodiments, perpendicular to conduit 517a, such that a through bore 511 and an axis 595 are angularly offset from or perpendicular to the through bore 512. In some embodiments, through bore 512 is a first through bore of the housing 505 that is angularly offset from a second through bore, such as through bore 511.

Still referring to FIGS. 6A and 6B, self-regulating flow control device 500 further comprises a piston or shuttle 550 slidingly disposed in cavity 512 along a central axis 515. The shuttle 550 comprises an upper end 550a; a lower end 550b; and an outer cylindrical surface 550c extending from upper to lower ends 550a, 550b, respectively. Shuttle 550 further comprises a cylindrical cavity or bore 520 coaxial with central axis 515 extending from shuttle lower end 550b up to cavity upper end 520a.

The shuttle 550 further comprises two annular seals 555 disposed on outer cylindrical surface 550c of shuttle 550 that provide a seal between outer cylindrical surface 550c of shuttle 550 and the inner cylindrical surface 530d of inner housing 530. Annular seals 555 may be made from an elastomeric material or from any other suitable sealing material. In other embodiments, fewer or more seals may be used. For example, in other embodiments, one seal 555 may be employed on outer cylindrical surface 550c. In yet other embodiments, three or more seals 555 may be employed on outer cylindrical surface 550c. If more than one seal 555 is employed, the seals may, but need not, be spaced equidistantly from one another.

The shuttle 550 is axially biased by a biasing member 580. In the present embodiment, biasing member 580 is a compression spring. Thus, to axially displace the shuttle 550 downward toward base 505d of outer housing 505, fluid pressure applied to through bore 510 and cavity 512 and acting on upper shuttle end 550a must produce a force oppositely directed to, and greater than, the force exerted by spring 580. The spring 580 is axially compressed between base 505d of outer housing 505 and cavity upper end 520a of shuttle 550.

Still referring to FIGS. 6A and 6B, in an unactuated state, where the uphole pressure (above self-regulating flow control device 500) is equivalent to the hydrostatic pressure (below device 500), the force of spring 580 causes the shuttle 550 to move upward such that there is no fluid communication from conduit 517a to adjacent conduit 517b (see FIG. 6A). As the pressure applied down through bore 512 increases, the increased pressure will eventually be greater than the combination of the hydrostatic pressure communicated through flow path 535 and the force of spring 580. The shuttle 550 will thus be forced to slide down toward outer housing base 505d. As the uphole pressure continues to increase, forcing spring 580 to compress farther and the shuttle 550 to slide down farther, the shuttle 550 will begin to expose flow paths or ports 540, 541, 543, 545, allowing fluid communication from through bore 512 to flow paths 540, 541, 543, 545 and through bore 511 in conduit 517b. As the pressure increases, the shuttle 550 slides farther down toward base 505d, eventually completely exposing flow paths 540, 541, 543, 545 to through bore 511 such that the upper end 550a of shuttle 550 is disposed below the lowest flow path 545 (see FIG. 6B). In addition, as the shuttle 550 is sliding down, the fluid in cavity 520 will be displaced through flow path 535.

Conversely, if there is a drop in uphole pressure, the lower pressure would be communicated to the top of shuttle 550. The shuttle 550 will start to slide up as the pressure exerted uphole becomes equivalent to or less than the hydrostatic pressure. The shuttle 550 slides up though the uphole and hydrostatic pressures acting on shuttle 550 are equivalent due to the force of spring 580, which is biased upward away from base 505*d*. Thus, as the pressure drops, the spring 580 forces shuttle 550 upward until flow paths or ports 540, 541, 543, 545 are no longer open to fluid communication between through bore 511 and through bore 512.

Self-regulating flow device 500 thus prevents a vacuum from being drawn into the conduit system below during sudden decreases in uphole pressure by blocking or closing flow paths 540, 541, 543, 545. In addition, device 500 allows a 90 degree turn in the system and can accommodate fluid flow in an opposite direction to flow 519 providing for increased flexibility in deployment of device 500, for example, fluid flow into conduit 517*b*, into cavity 512, and then up and out through conduit 517*a*.

Figure 7:
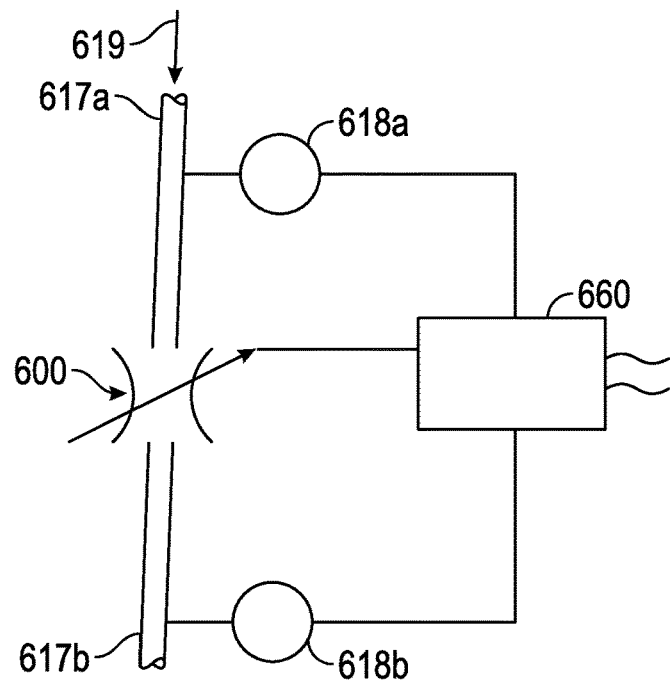
FIG. 7 is a schematic of a fifth embodiment of a flow control system in accordance with the principles described herein.

Referring now to FIG. 7, an embodiment 600 of the self-regulating flow control device 110 of FIG. 2 is shown. The self-regulating flow control device 600 comprises a control module 660 in fluid communication with an upstream conduit 617*a* and a downstream conduit 617*b*. The control module 660 reads both the pressure 618*a* in the upstream conduit 617*a* and the pressure 618*b* in the downstream conduit 617*b*. Pressure transducers or any other suitable means to measure pressure may be used. In other embodiments, the pressure 618*b* measured at conduit 617*b* may be hydrostatic pressure, downstream pressure, or both. Based on the pressures 618*a*, 618*b*, respectively, at conduits 617*a*, 617*b*, respectively, the control module 660 will make adjustments by signaling the flow control device 600 to open or close to relieve any pressure imbalance. For example, if upstream pressure 618*a* is greater than downstream or hydrostatic pressure 618*b*, the control module 660 will direct the flow control device 600 to open until the pressure 618*a*, 618*b* is equalized. Conversely, if the downstream or hydrostatic pressure 618*b* is greater than the upstream pressure 618*a*, the control module 660 will direct the flow control device 600 to close thereby preventing conduit 617*a* from collapsing or creating a vacuum due to greater downhole pressure 618*b*.

Figure 8:
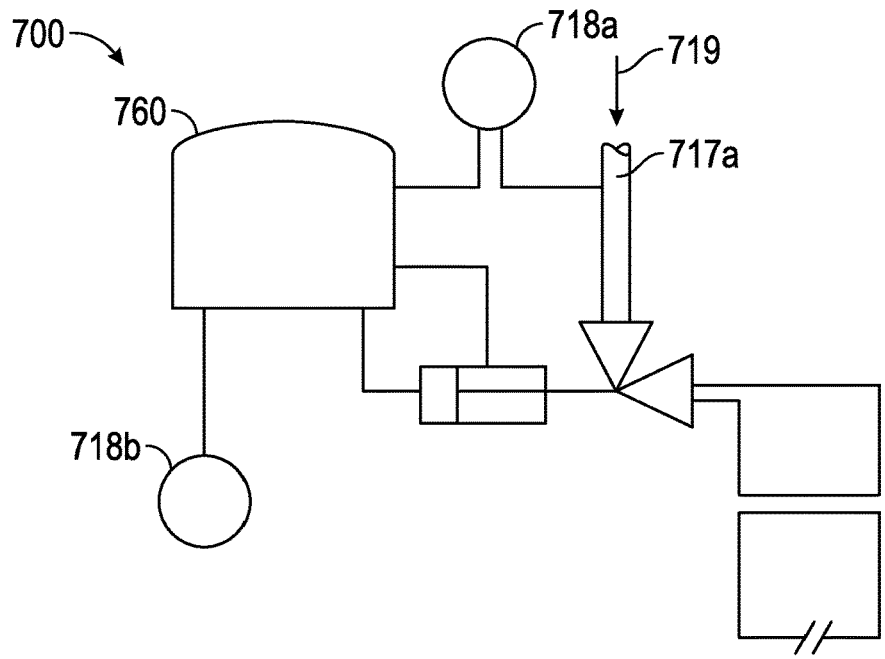
FIG. 8 is a schematic of a sixth embodiment of a flow control system in accordance with the principles described herein.

Referring now to FIG. 8, an embodiment of a self-regulating flow control device 700 comprises an electro-hydraulic control module 760 in fluid communication with an upstream conduit 717*a* and a downstream conduit 717*b*. The electro-hydraulic control module 760 measures both the pressure 718*a* in the upstream conduit 717*a* and the pressure 718*b* in the downstream conduit 717*b*. Pressure transducers or any other suitable means to measure pressure may be used. In other embodiments, the pressure 718*b* measured at conduit 717*b* may be hydrostatic pressure or downstream pressure. Based on the pressures 718*a*, 718*b* at conduits 717*a*, 717*b*, the control module 760 will emit an hydraulic pulse or pressure to open or close the flow control device 700 to relieve the pressure imbalance. For example, if upstream pressure 718*a* is greater than downstream or hydrostatic pressure 718*b*, the control module 760 will emit an hydraulic pulse to open the flow control device 700. Conversely, if the downstream or hydrostatic pressure 718*b* is greater than the upstream pressure 718*a*, the control module 760 will emit an hydraulic pulse to close the flow control device 700 thereby preventing conduit 717*a* from collapsing or creating a vacuum due to greater downhole pressure 718*b*.

The various features described above are not limiting of the disclosure, but rather an exemplary illustration of the principles of the disclosure. Such features can be used in various combinations for desired results pursuant to the scope of the disclosure as set forth in the claims below.

What is claimed is:

1. A self-regulating flow control device comprising:
 a main body comprising a through bore, the through bore having an upstream end and a downstream end;
 a cavity intersecting the through bore between the upstream end and the downstream end and angularly offset from the through bore;
 a piston comprising an aperture;
 a biasing member; and
 a first fluid flow path between the through bore upstream end and the cavity on a side of the piston opposite the biasing member to communicate pressure therebetween;
 wherein, in an unactuated position, the biasing member biases the piston such that the aperture is enclosed in the cavity and isolated from the first fluid flow path, and the first fluid flow path is able to communicate pressure between the through bore upstream end and the side of the piston opposite the biasing member;
 wherein, in the unactuated position, the communicated pressure in the first fluid flow path overcomes the biasing member to move the aperture into the through bore.

2. A self-regulating flow control device comprising:
 a main body comprising a through bore, the through bore having an upstream end and a downstream end;
 a cavity intersecting the through bore between the upstream end and the downstream end and angularly offset from the through bore;
 a piston comprising an aperture;
 a biasing member;
 a first fluid flow path between the through bore upstream end and the cavity on a side of the piston opposite the biasing member to communicate pressure therebetween;
 wherein, in an unactuated position, the biasing member biases the piston such that the aperture is enclosed in the cavity, and the first fluid flow path is able to communicate pressure between the through bore upstream end and the side of the piston opposite the biasing member;
 wherein, in the unactuated position, the communicated pressure in the first fluid flow path overcomes the biasing member to move the aperture into the through bore; and
 a second fluid flow path between the cavity and an exterior portion of the main body to vent to atmosphere.

3. The device of claim 2, wherein the second fluid flow path is in fluid communication with the biasing member and further comprises a filter.

4. The device of claim 1 further comprising a control module coupled to pressure transducers disposed upstream and downstream of the device.

5. The device of claim 4, wherein the control module is an electro-hydraulic control module.

6. The device of claim 1, wherein when a reduced pressure is applied through the first fluid flow path and into the cavity, the biasing member overcomes the reduced pressure to move the aperture out of the through bore.

7. A self-regulating flow control device comprising:
 a housing assembly comprising a through bore with an upper through bore and a lower through bore;

a piston moveable to position an aperture in and out of the through bore, the piston disposed between the upper through bore and the lower through bore;

a biasing member; and a first fluid flow path between the upper through bore and a side of the piston opposite the biasing member to communicate pressure therebetween;

wherein, in an unactuated position, the biasing member biases the piston such that the upper through bore is isolated from the lower through bore and the aperture, and the first fluid flow path is able to communicate pressure between the upper through bore and the side of the piston opposite the biasing member;

wherein, in the unactuated position, the communicated pressure overcomes the biasing member to move the piston and expose the upper through bore to the aperture and the lower through bore.

8. The device of claim 7, wherein when a reduced pressure is applied through the first fluid flow path, the biasing member overcomes the reduced pressure to move the piston and re-isolate the aperture and the lower through bore from the upper through bore.

9. The device of claim 7 further comprising a second fluid flow path between the cavity and an exterior portion of the housing assembly to vent to atmosphere.

* * * * *